(12) United States Patent
Tanaka et al.

(10) Patent No.: US 6,678,118 B2
(45) Date of Patent: Jan. 13, 2004

(54) MAGNETIC HEAD CLEANER MECHANISM HAVING FEATURE FOR BRINGING BRUSH INTO SECURE CONTACT WITH MAGNETIC HEAD WHEN NECESSARY

(75) Inventors: Atsushi Tanaka, Yamagata (JP); Takeshi Suzuki, Yamagata (JP); Hiroyuki Shimanuki, Yamagata (JP)

(73) Assignee: NEC Corporation, Tokyo (JP)

( * ) Notice: Subject to any disclaimer, the term of this patent is extended or adjusted under 35 U.S.C. 154(b) by 227 days.

(21) Appl. No.: 09/983,234

(22) Filed: Oct. 23, 2001

(65) Prior Publication Data

US 2002/0048118 A1 Apr. 25, 2002

(30) Foreign Application Priority Data

Oct. 24, 2000 (JP) ........................ 2000-324262

(51) Int. Cl.[7] .................................. G11B 5/41
(52) U.S. Cl. ........................................ 360/128
(58) Field of Search ................ 360/128; 15/DIG. 12

(56) References Cited

U.S. PATENT DOCUMENTS 6,252,739 B1 * 6/2001 Todd et al. ............... 360/128
6,433,961 B1 * 8/2002 Tsuchiya et al. ........... 360/128
2002/0181145 A1 * 12/2002 Tsuchiya ...................... 360/95

FOREIGN PATENT DOCUMENTS

| JP | 59030225 A | * | 2/1984 | ........... G11B/5/41 |
| JP | U 61-130012 | | 8/1986 | |
| JP | 62125565 A | * | 6/1987 | ........... G11B/15/67 |
| JP | 01191317 A | * | 8/1989 | ........... G11B/5/41 |
| JP | U 3-98709 | | 10/1991 | |
| JP | 06131637 A | * | 5/1994 | ........... G11B/5/41 |
| JP | 06274841 A | * | 9/1994 | ........... G11B/5/41 |
| JP | A 10-11724 | | 1/1998 | |
| JP | A 11-328635 | | 11/1999 | |
| JP | A 2000-149236 | | 5/2000 | |
| JP | A 2000-195024 | | 7/2000 | |

* cited by examiner

*Primary Examiner*—William Korzuch
*Assistant Examiner*—Mark Blouin
(74) *Attorney, Agent, or Firm*—Young & Thompson

(57) ABSTRACT

A brush for cleaning a magnetic head is attached to a brush arm. A first portion of the brush arm is rotatably attached to a threader arm for transporting a leading end of a magnetic tape from a cartridge to a machine reel. A second portion of the brush arm is slidably engaged with a cam groove in a predetermined pattern. The brush moves associated with movements of the threader arm, and comes into contact with the magnetic head only when the threader arm stays at a predetermined position.

7 Claims, 8 Drawing Sheets

MAGNETIC HEAD CLEANER MECHANISM HAVING FEATURE FOR BRINGING BRUSH INTO SECURE CONTACT WITH MAGNETIC HEAD WHEN NECESSARY

BACKGROUND OF THE INVENTION

1. Field of the Invention

The present invention relates to a magnetic tape apparatus, and more particularly, to a magnetic head cleaner mechanism for cleaning a magnetic head of a magnetic tape apparatus.

2. Description of the Related Art

Conventionally, a magnetic tape apparatus is known which has a magnetic head cleaner mechanism for purposes of cleaning a magnetic head thereof without troubling an operator about such work. As a prior art example, a magnetic tape apparatus described in Laid-open Japanese Patent Application No. 328635/1999 will be described below with reference to FIGS. 1 through 3. FIG. 1 is a schematic diagram illustrating the configuration of the magnetic tape apparatus. FIGS. 2, 3 are enlarged views of a magnetic head cleaner mechanism equipped in the magnetic tape apparatus, wherein FIG. 2 shows that brush 103 is in contact with a magnetic head 101, and FIG. 3 shows that brush 103 is spaced apart from magnetic head 101.

As illustrated in FIG. 1, the magnetic tape apparatus comprises magnetic head 101 for writing data into magnetic tape 102 and reading data recorded on magnetic tape 102; and machine reel 106 rotatable by a rotary mechanism, not shown. The magnetic tape apparatus is loaded with cartridge 104 which can wind up magnetic tape 102 and hold wound magnetic tape 102 therein. Generally, cartridge 104 is loaded into the magnetic tape apparatus, with magnetic tape 102 wound up and held in cartridge 104. At that time, leader block 105 attached to a leading end of magnetic tape 102 is latched on the case of cartridge 104. The magnetic tape apparatus also has threader arm 116 which comprises thread pin 107 disposed at a leading end thereof for engagement with leader block 105, and is driven by a driving mechanism, not shown, to move thread pin 107 along predetermined trajectory 107a.

As cartridge 104 is loaded into the magnetic tape apparatus for recording or reproducing magnetic tape 102, thread pin 107 is brought into engagement with leader block 105 positioned at an end of the case of cartridge 104. Then, thread pin 107 is moved, together with leader block 105, along trajectory 107a to the center of machine reel 106 passing by magnetic head 101. When machine reel 106 is rotated in this state, magnetic tape 102 can be wound around machine reel 106. Thus, recording or reproduction can be performed on magnetic tape 102 while the magnetic tape 102 is being fed by being wound around machine reel 106.

The foregoing magnetic tape apparatus has a magnetic head cleaner mechanism with brush 103 which is brought into contact with magnetic head 101 for cleaning the same. The magnetic head cleaner mechanism comprises rotatably supported opening link 110; closing link 111; and follower link 120. Follower link 120 has an elongated hole formed through a leading end thereof, and opening link 110 has a leading end engaged with and slidable along the elongated hole of follower link 120. Brush 103 is disposed near the location at which opening link 110 is engaged with follower link 120. Closing link 111 is engaged with opening link 110 such that it is rotated together with closing link 111.

As illustrated in FIG. 2, follower link 120 includes click tab 121a which is in contact with click spring 121b. A clicking mechanism comprised of click tab 121a and click spring 121b allows follower link 120 to stay at two predetermined positions, i.e., a position at which brush 103 comes into contact with magnetic head 101 as illustrated in FIG. 2, and at a position at which brush 103 moves away from magnetic head 101 as illustrated in FIG. 3.

When neither recording nor reproduction is performed, the magnetic head cleaner mechanism remains with brush 103 in contact with magnetic head 101, as illustrated in FIG. 2. In this state, magnetic head 101 can be cleaned by vibrating magnetic head 101 in a vertical direction to a track direction (vertical direction on the drawing sheet).

In the state illustrated in FIG. 2, a portion of opening link 110 lies on trajectory 107a of thread pin 107. Therefore, upon recording or reproduction, after cartridge 104 is loaded, as thread pin 107 carrying leader block 105 is moved along trajectory 107a, opening link 110 is pushed by thread pin 107. This causes transition of the magnetic head cleaner mechanism to the state illustrated in FIG. 3, where brush 103 is away from magnetic head 101.

In the state illustrated in FIG. 3, a portion of closing link 111 lies on trajectory 107a of thread pin 107. Therefore, after completion of recording or reproduction, as thread pin 107 carrying leader block 105 is moved along trajectory 107a, closing link 111 is pushed by thread pin 107. This causes the magnetic head cleaner mechanism to return again to the state illustrated in FIG. 2.

The prior art example described above has the following disadvantages. First, since the magnetic head cleaner mechanism and the threading mechanism are independent of each other, a larger number of parts are required for the magnetic head cleaner mechanism, resulting in an increase in the unit price of the mechanism. Also, for switching the brush to come into contact with the magnetic head and move away from the same, the threader pin must be operated over a wide range. Further, while the clicking mechanism is used for fixing the brush at the predetermined positions, this clicking mechanism may likely cause a transition of the brush between the state illustrated in FIG. 2 and the state illustrated in FIG. 3 due to vibrations or the like. Such a transition could cause brush 103 to collide with head 101, for example, during recording or reproduction. Moreover, since opening link 110, closing link 111 and follower link 120 are moved over a large distance, the magnetic head cleaner mechanism requires a large space.

SUMMARY OF THE INVENTION

It is an object of the present invention to provide a magnetic head cleaner mechanism comprised of a smaller number of parts, as compared with the prior art example, which is reliably capable of cleaning a magnetic head without fail even at a low accuracy of parts.

It is another object of the present invention to provide a magnetic head cleaner mechanism which does not require an extra space.

It is a further object of the present invention to provide a magnetic head cleaner mechanism which is free from defective operations even with vibrations applied thereto.

A magnetic tape apparatus, which incorporates the magnetic head cleaner mechanism of the present invention, is loaded with a cartridge which can wind up a magnetic tape and hold the wound magnetic tape therein. The magnetic tape apparatus has a magnetic head, a machine reel, and a threader arm. The threader arm holds a leading end of a magnetic tape held in the cartridge, and leads it from the cartridge to the machine reel and vice versa passing by the magnetic head. After the leading end of the magnetic tape has been led to the machine reel, the machine reel is rotated to wind the magnetic tape therearound, so that the magnetic tape is fed passing by the magnetic head. In this event, the magnetic head writes data onto the magnetic tape or reads data written on the magnetic tape.

The magnetic head cleaner mechanism of the present invention is provided for cleaning the magnetic head in the magnetic tape apparatus as described above. The magnetic head cleaner mechanism has a brush arm. The brush arm has a first portion rotatably attached to the threader arm, and a second portion slidably engaged with a cam groove. A brush holder for holding a brush is attached to the brush arm.

In the foregoing configuration, the brush arm moves following movements of the threader arm for moving the leading end of the magnetic tape between the cartridge and the machine reel. The movement of the brush arm in this event can be adjusted by controlling the pattern of the cam groove, the position at which the brush arm is attached to the threader arm, and so on. Thus, the magnetic head cleaner can be configured such that the brush comes into contact with the magnetic head when the threader arm stays at a predetermined position and moves away from the magnetic head when the threader arm leaves that position.

In this way, the magnetic head can be cleaned by the brush which is brought into contact with the magnetic head without fail when the threader arm is forced to the predetermined position. On the other hand, except when the magnetic head is cleaned, the threader arm is moved away from the predetermined position, thereby making it possible to keep the brush away from the magnetic head without fail and securely maintain the brush away from the magnetic tape. By thus keeping the brush from the magnetic head except when the magnetic head is cleaned, it is possible to delay a deterioration of the brush and extend the lifetime of the magnetic head cleaner mechanism.

The foregoing configuration comprises the magnetic head cleaner mechanism using the threader arm constituting the threading mechanism as one component of the magnetic head cleaner mechanism, thereby making it possible to reduce the number of components required for the magnetic head cleaner mechanism and hence save the cost.

The cam groove which forms part of the magnetic head cleaner mechanism can be disposed beside the magnetic head, without the need for disposing it in front of the magnetic head, so that a large space need not be ensured in front of the magnetic head for installing the magnetic head cleaner mechanism. For this reason, the magnetic tape apparatus which incorporates the magnetic head cleaner mechanism according to the present invention can be made in a size equal to a conventional magnetic tape apparatus. Therefore, the magnetic tape apparatus which comprises the improved magnetic head cleaner mechanism according to the present invention can be installed in a system which has a slot in determined dimensions for incorporating a magnetic tape apparatus therein.

In the foregoing configuration, the predetermined position of the threader arm at which the brush comes into contact with the magnetic head may be the position at which the end of the magnetic tape is pulled out from the cartridge.

In addition, a resilient element such as a leaf spring may be provided for urging the brush holder toward the magnetic head when the threader arm stays at the predetermined position. This can ensure that the brush comes into contact with the magnetic head when the threader arm is moved to the predetermined position. Also, in this case, since the brush can be brought into contact with the magnetic head without fail even if associated parts exhibit a slightly low accuracy, the manufacturing cost can be reduced by degrading the accuracy of parts without damaging the performance of the magnetic head cleaner mechanism.

The cam groove which forms part of the magnetic head cleaner mechanism may be formed in a brush cam plate attached to a deck base on which associated members of the magnetic tape apparatus are fixed, or formed directly in the deck base.

Movements of the brush associated with movements of the threader arm can be set as appropriate in accordance with the pattern of the cam groove. The cam groove can be shaped such that the brush is moved not only in a direction parallel to the surface of the magnetic head but also in a direction perpendicular to the surface of the magnetic head. In this way, the brush can be promptly moved away from the magnetic head when the threader arm is moved from the aforementioned predetermined position.

The above and other objects, features and advantages of the present invention will become apparent from the following description with reference to the accompanying drawings which illustrate examples of the present invention.

BRIEF DESCRIPTION OF THE DRAWINGS

FIGS. 4a and 4b are schematic diagrams of a cartridge loaded into a magnetic tape apparatus according to an embodiment of the present invention, wherein FIG. 4a is a plan view, and FIG. 4b is a front view.

DESCRIPTION OF THE PREFERRED EMBODIMENTS

An embodiment of the present invention will be described below with reference to FIGS. 4a through 12.

Figure 1:
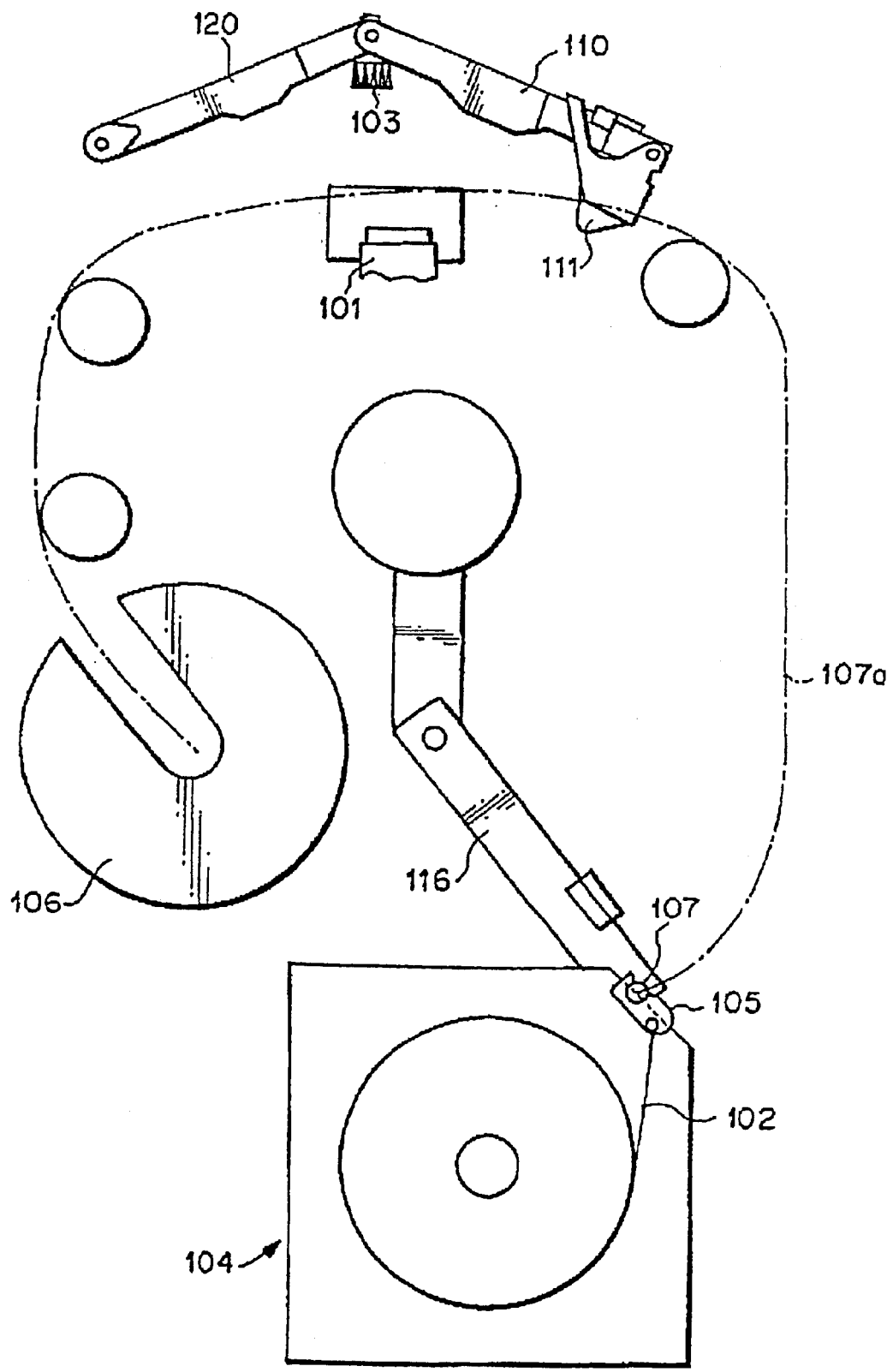
FIG. 1 is a schematic diagram illustrating the configuration of a magnetic tape apparatus of a prior art example.
Figure 2:
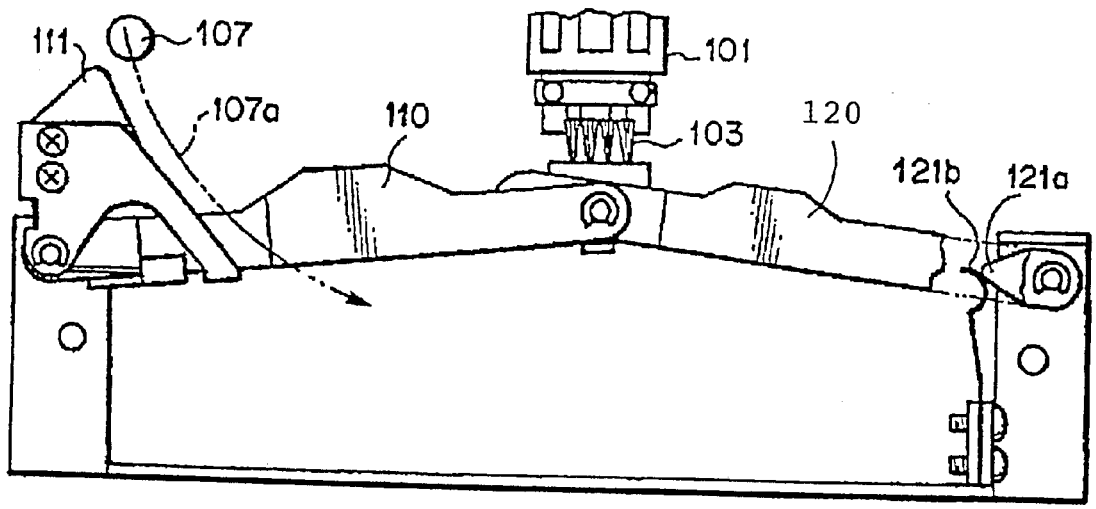
FIG. 2 is an enlarged view of a magnetic head cleaner mechanism equipped in the magnetic tape apparatus of FIG. 1.
Figure 3:
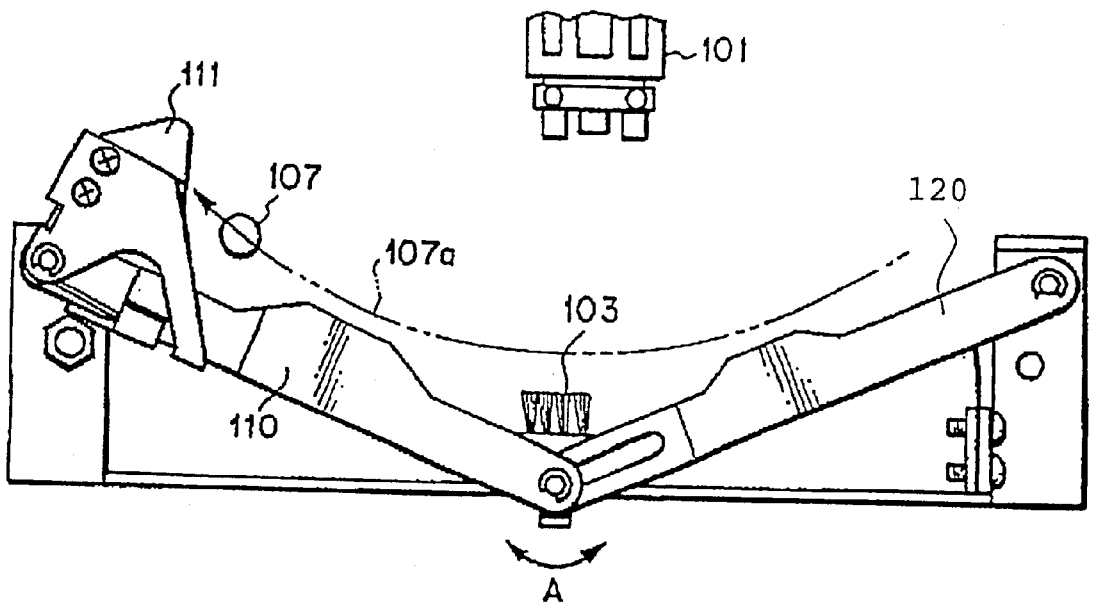
FIG. 3 is an enlarged view of the magnetic head cleaner mechanism in a state different from FIG. 2.
Figure 4A:
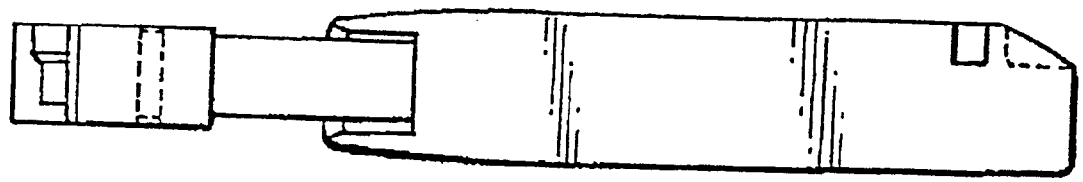
Figure 4B:
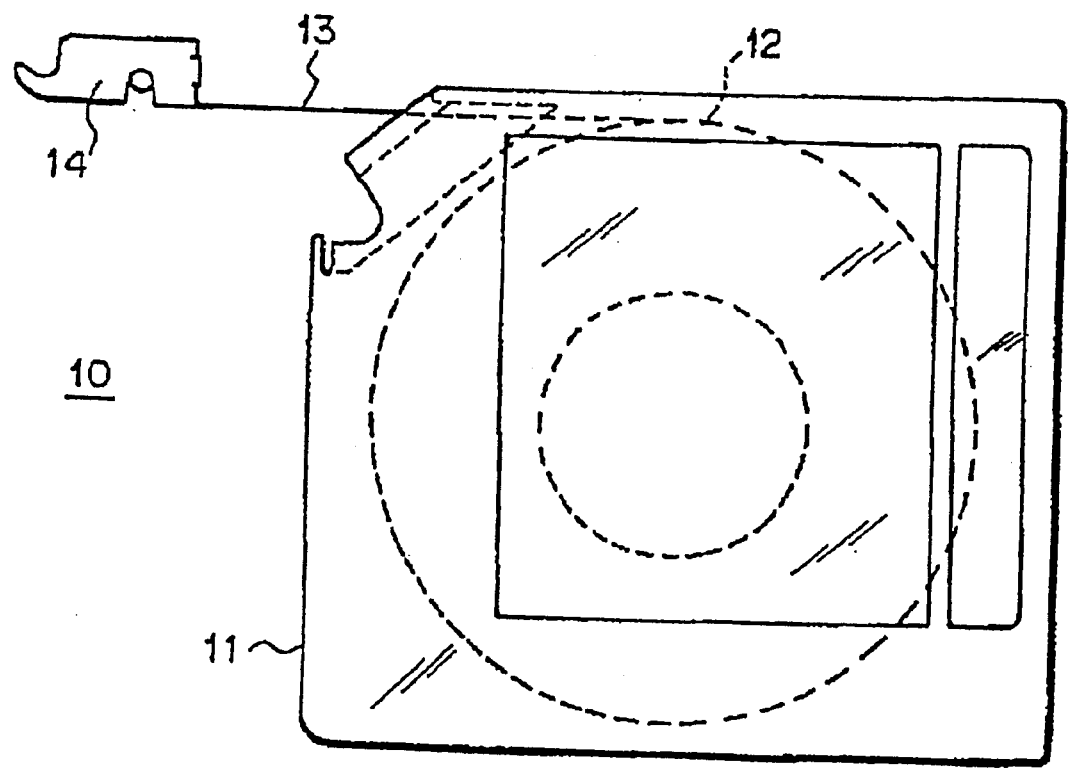

As shown in FIGS. 4a, 4b, the cartridge 10 loaded into a ½" cartridge magnetic tape apparatus according to the embodiment, which has reel 12 within case 11, can wind up magnetic tape 13 around reel 12 and hold therein wound magnetic tape 13. Leader block 14 is attached to a leading end of magnetic tape 13. Leader block 14 is latched on case 11, with magnetic tape 13 fully wound up around reel 12.

The ½" cartridge magnetic tape apparatus of this embodiment has machine reel 1 rotatable by a rotary mechanism, not shown, and magnetic head 2 for writing data onto magnetic tape 13 and reading data recorded on magnetic tape 13. The ½" cartridge magnetic tape apparatus also comprises a threading mechanism which is brought into engagement with leader block 14 for transportation from cartridge 10 to machine reel 1 passing by magnetic head 2, and, conversely, for return from machine reel 1 to cartridge 10. The threading mechanism comprises a threader base (not shown); threader arm 4 rotatably supported by the threader base; and a driving mechanism, not shown, for rotating threader arm 4. Threader pin 3, engageable with leader block 14, is fixed at a leading end of threader arm 4.

In this embodiment, the magnetic head cleaner mechanism is configured in combination with the threading mechanism. Specifically, brush post 5, extending in a direction parallel to the rotating shaft of threader arm 4, is fixed to threader arm 4, and one end of brush arm 25 is rotatably fixed to threader arm 4 through bearing 6-1 (see FIG. 8). The other end of brush arm 25 is engaged with cam groove 21-1 in a predetermined pattern, formed in brush cam plate 21, so that brush arm 25 is restrained by and moved along cam groove 21-1. Brush cam plate 21 is fixed, through cam plate post 29 (see FIG. 8), to deck base 7 on which a variety of parts are attached. Brush arm 25 is engaged with cam groove 21-1 through bearing 6-2 attached to brush arm 25, so that a movement of brush arm 25 causes bearing 6-2 to roll along cam groove 21-1 of brush cam plate 21.

Brush unit 22, comprised of brush 24 brought into contact with the magnetic head for cleaning the same, and brush holder 23 for supporting brush 24, is attached to brush arm 25. Brush post 26 (see FIGS. 10 through 12) fixed vertically to brush arm 25 is inserted into elongated hole 30 (see FIGS. 11, 12) formed through brush holder 23, while boss 31 (see FIGS. 9, 11, 12) formed on brush holder 23 is inserted into elongated hole 32 (see FIGS. 9, 11, 12) formed through brush arm 25. Brush holder 23 is attached in this state, so that it is made movable, by the two constraints, relative to brush arm 25 only in directions indicated by arrows in FIGS. 11, 12. Brush holder 23 is also urged toward the side of brush 24 by brush leaf spring 27 (FIGS. 9 through 12) from the opposite side of brush 24.

Carbon containing plastic is preferably used as a material for brush holder 23, while carbon containing nylon fiber is preferably used as a material for brush 24. Also, preferably, all members related to the fixation of brush 24, such as brush arm 25, brush post 26 for fixing brush unit 22, and so on are formed of an electrically conductive material. In this way, magnetic head 2 can be prevented from being charged when magnetic head 2 is cleaned by brush unit 22. Further prevention of charging can be achieved by using electrically conductive materials for an adhesive or a double-sided adhesive tape for use in fixing brush 24 to brush holder 23.

Next described will be the operation of the ½" cartridge magnetic tape apparatus according to this embodiment.

Figure 5:
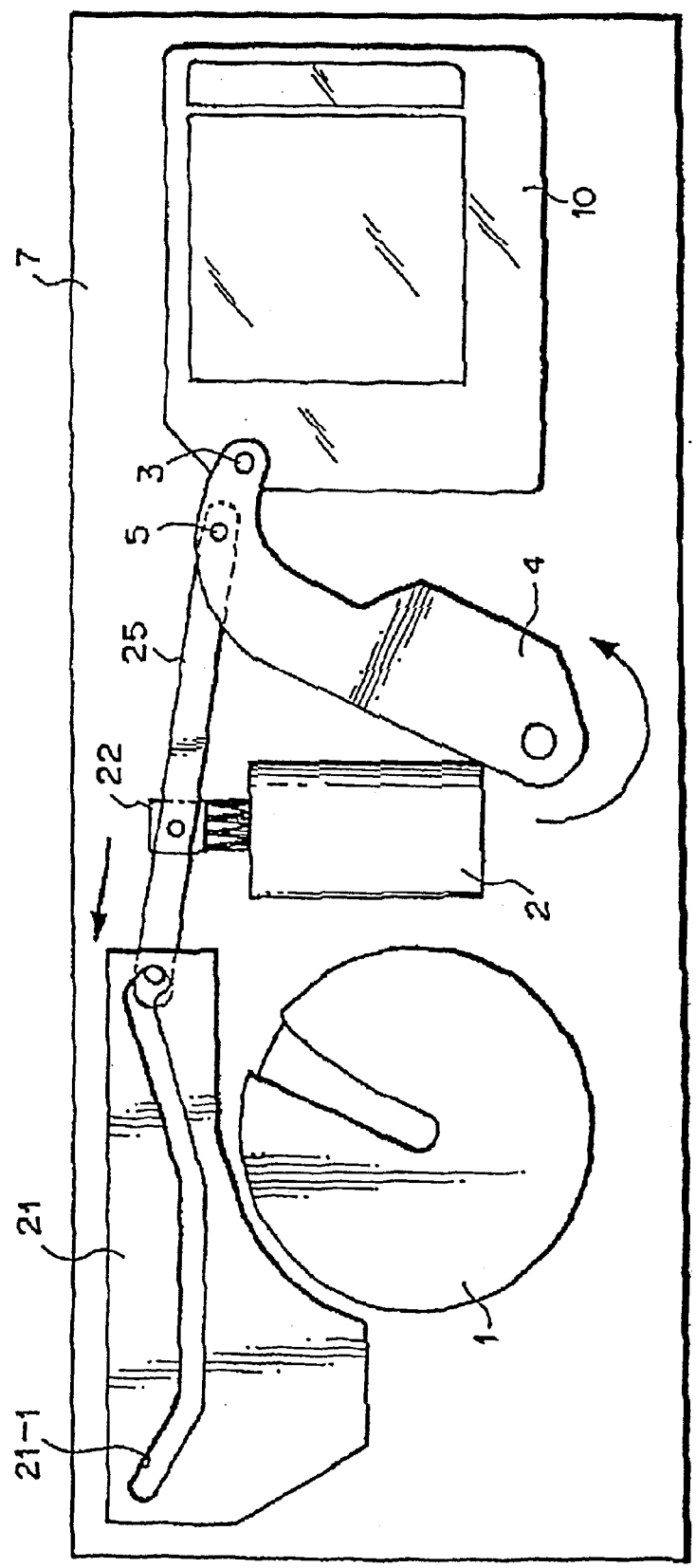
FIG. 5 is a schematic diagram illustrating the configuration of a ½" cartridge magnetic tape apparatus according to the embodiment of the present invention.
Figure 11:
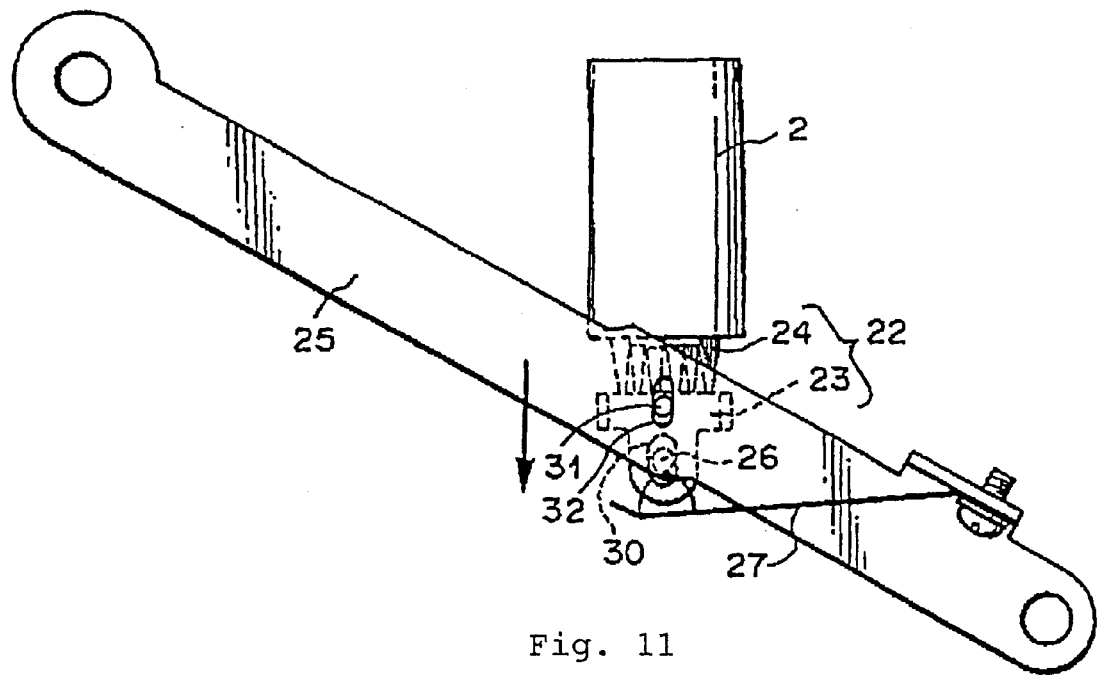
FIG. 11 is a perspective view illustrating a relative positional relationship between a magnetic head and a brush unit, with brush being positioned to be in contact with magnetic head.

Immediately after cartridge 10 has been loaded into the magnetic tape apparatus, threader arm 4 for transporting leader block 14 to machine reel 1 is positioned in engagement with leader block 14 which is latched on case 11 of cartridge 10, as illustrated in FIG. 5. In this state, brush unit 22 attached to brush arm 25 is positioned such that brush 24 is in contact with the front surface of magnetic head 2. In this event, brush unit 22 is attached only for movement in one direction by boss 31, brush post 26 and elongated holes 30, 32, so that brush unit 22 is restrained such that brush 24 is oriented in parallel to a perpendicular extending through the top surface of the magnetic head 2, as illustrated in FIG. 11. And, in this state, boss 31 and brush post 26 are positioned in the middle of elongated holes 32, 30, respectively, with brush 24 pressed onto magnetic head 2 by brush leaf spring 27 with a proper force. Magnetic head 2 can be cleaned by vibrating magnetic head 2 in this state by an elevating mechanism attached thereto.

Figure 6:
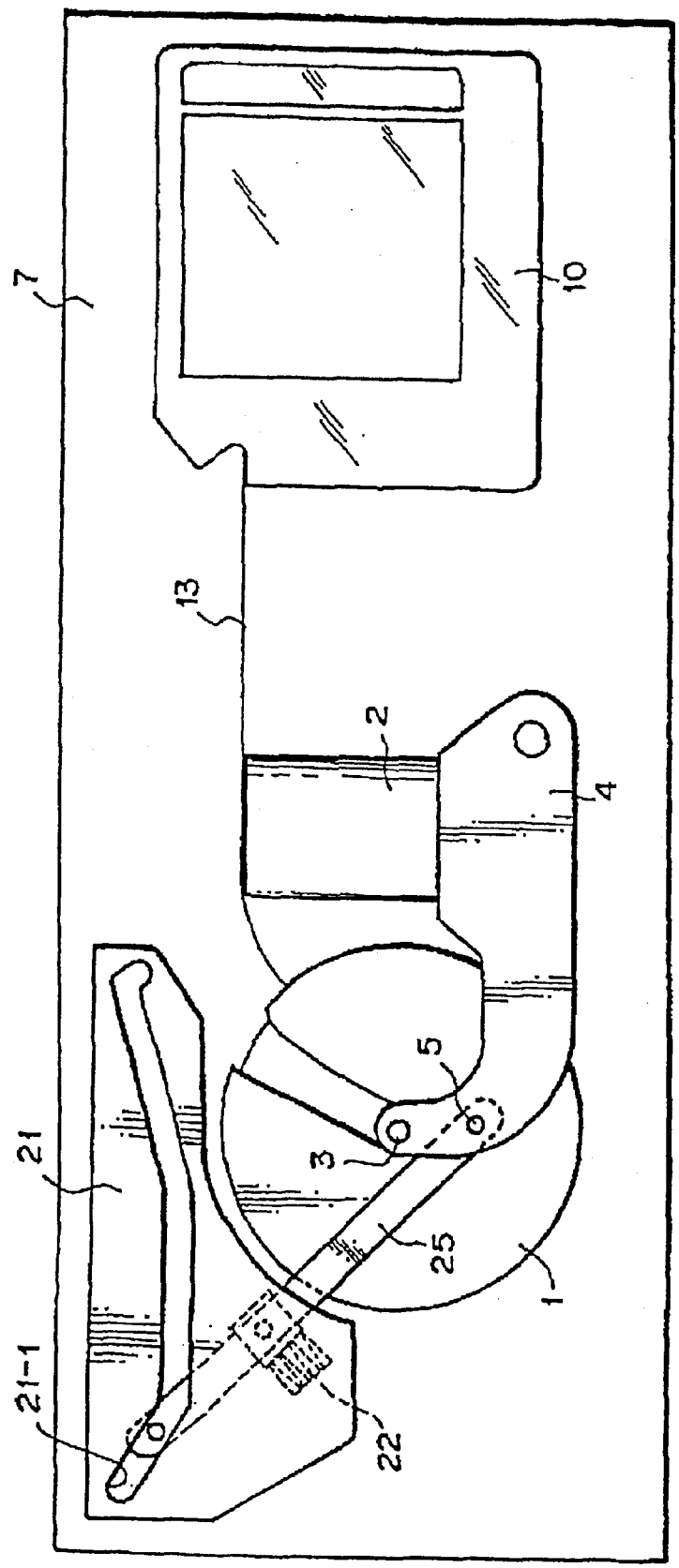
FIG. 6 is a schematic diagram illustrating the ½" cartridge magnetic tape apparatus in a state different from FIG. 5.
Figure 7:
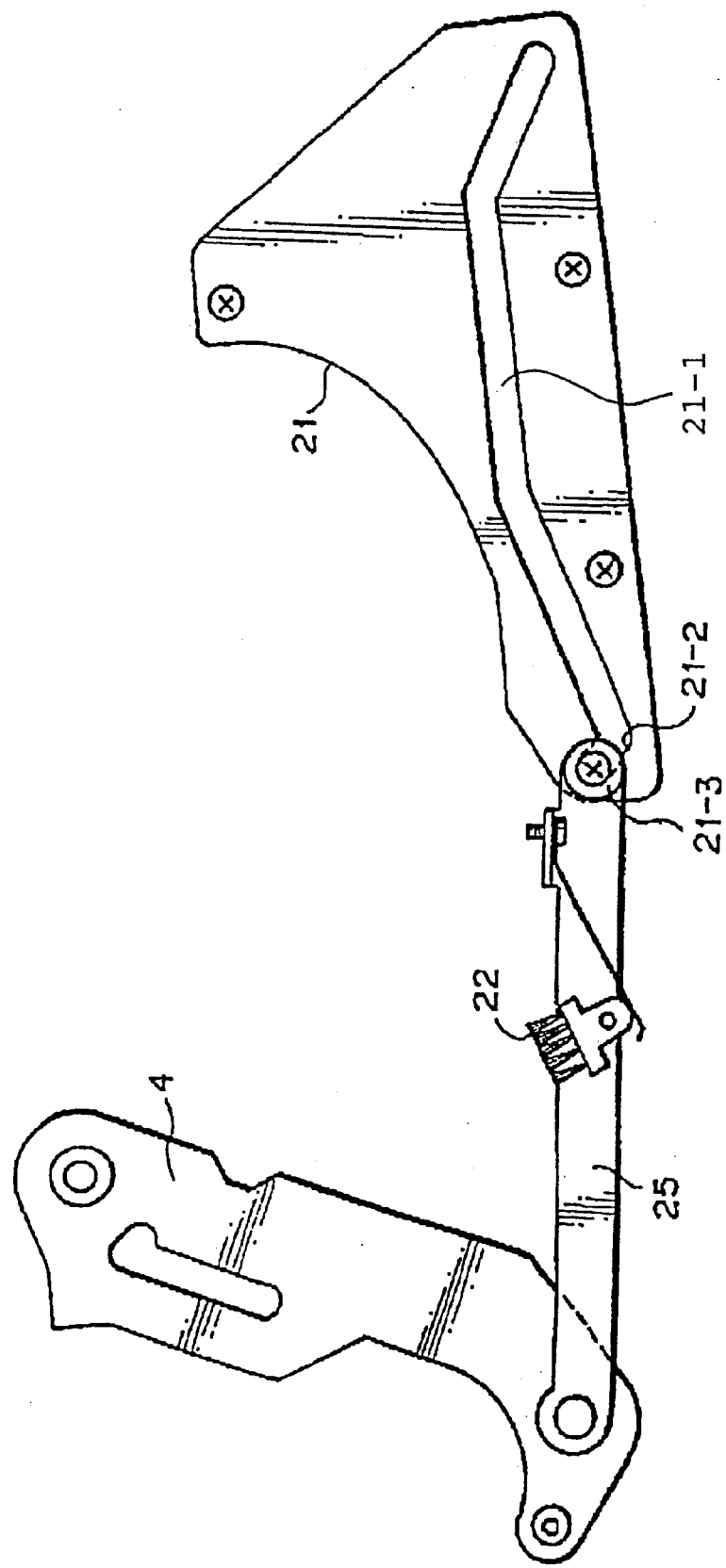
FIG. 7 is an enlarged view of a magnetic head cleaner mechanism equipped in the ½" cartridge magnetic tape apparatus of FIG. 5.
Figure 8:
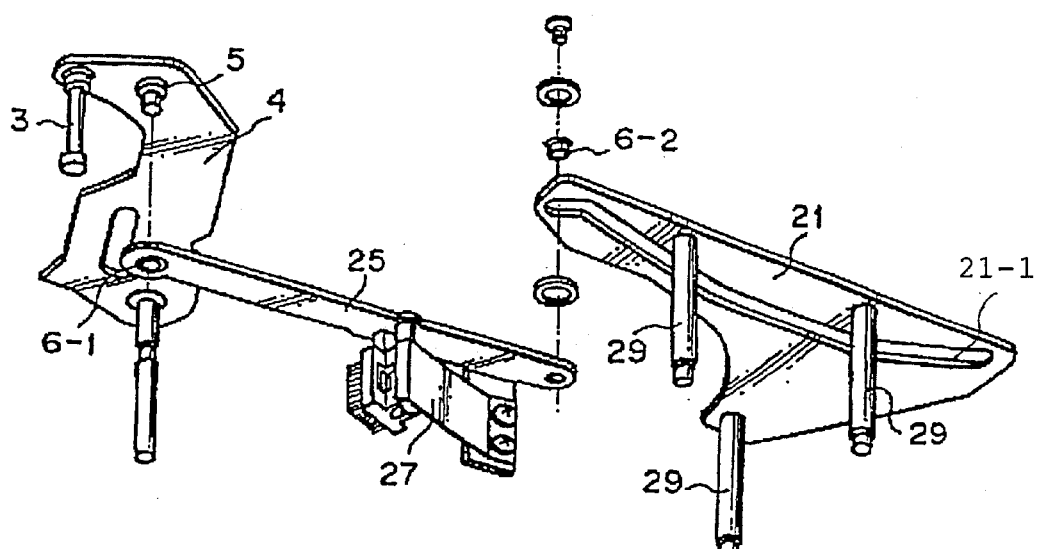
FIG. 8 is an exploded perspective view of the magnetic head cleaner mechanism of FIG. 7.
Figure 9:
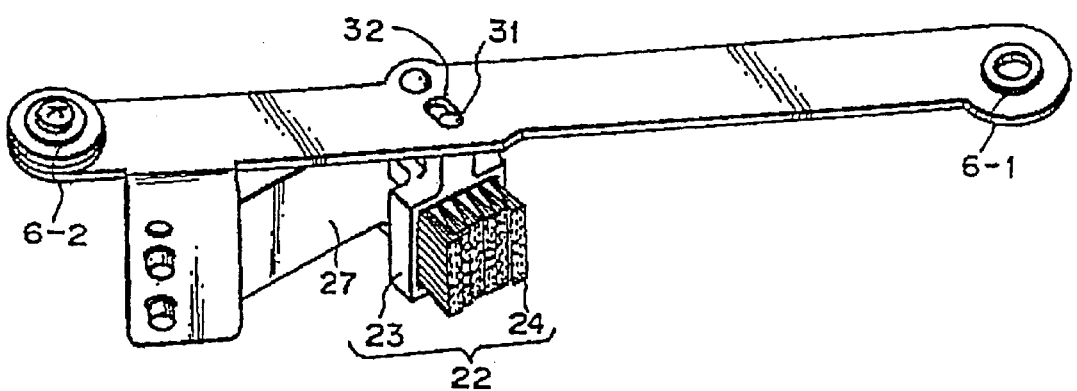
FIG. 9 is a perspective view of a brush arm disposed in the magnetic head cleaner mechanism.
Figure 10:
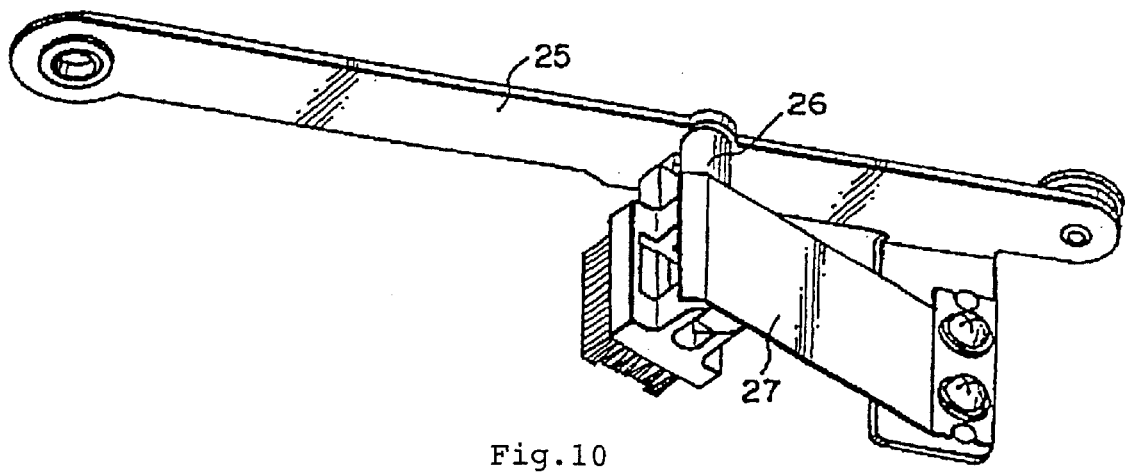
FIG. 10 is a perspective view of the brush arm viewed from a different direction from that of FIG. 9.

Next, before starting recording or reproduction of magnetic tape 13, threader arm 4 is rotated to a position indicated in FIG. 6, at which threader pin 3 is positioned at the center of machine reel 1. In this event, brush arm 25 moves associated with a movement of threader arm 4, forcing brush unit 22 to move to a position away from magnetic head 2. As brush unit 22 moves away from magnetic head 2, brush holder 23, urged by brush plate spring 27, is held with brush post 26 in abutment to one end of elongated hole 30, as illustrated in FIG. 12.

In this event, one end of brush arm 25 is engaged with cam groove 21-1 of brush cam plate 21 through bearing 6-2, as described above, so that brush unit 22 can be moved along a desired trajectory conforming to the pattern of cam groove 21-1. In this way, brush unit 22 can be retracted to a desired position without brush unit 22 interfering with other members.

After recording or reproduction has been completed on magnetic tape 13, magnetic tape 13 is again wound into cartridge 10, and threader arm 4 is returned again to the position indicated in FIG. 5. Magnetic head 2 is cleaned by vertically moving magnetic head 2 in this state.

Figure 12:
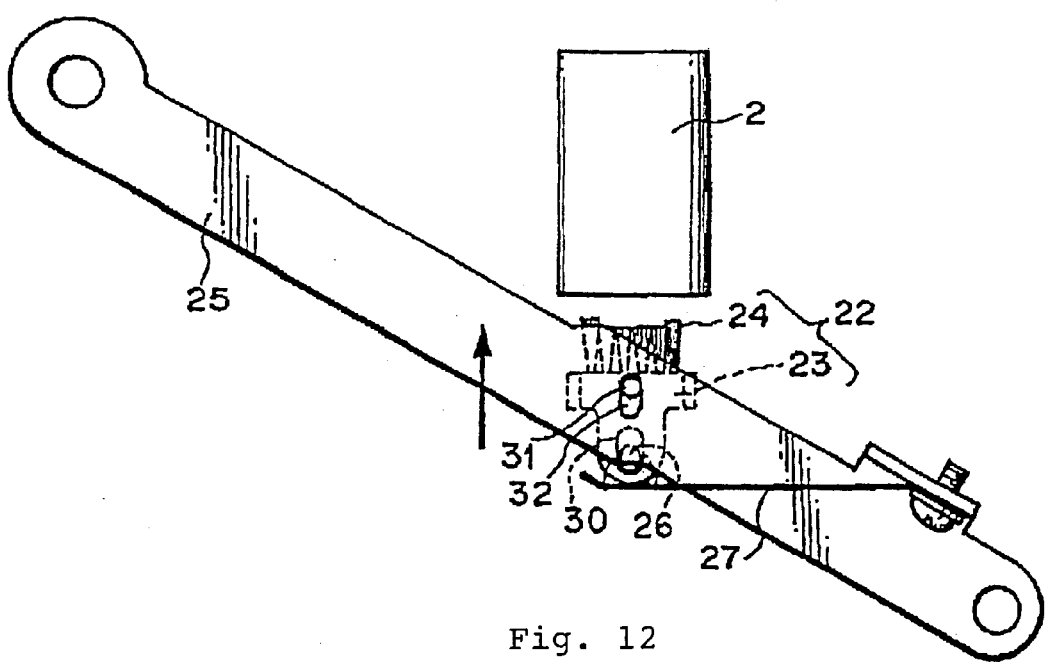
FIG. 12 is a perspective view illustrating a relative positional relationship between the magnetic head and the brush unit, with brush being positioned slightly away from the magnetic head.

In a further embodiment, the ½" cartridge magnetic tape apparatus of this embodiment may be provided with a controller which returns brush arm 25 slightly from the starting point of cartridge 10 to machine reel 1 such that brush unit 22 is located at a position slightly away from magnetic head 2, as illustrated in FIG. 12, in a standby state in which the magnetic tape apparatus is not loaded with cartridge 10. In this case, in the standby state, bearing 6-2 is located at position 21-2 slightly away from position 21-3 at which threader arm 4 is brought to the starting point of cartridge 10 (see FIG. 7). Then, bearing 6-2 is brought to position 21-3 so that brush 24 comes into contact with the front surface of magnetic head 2, as illustrated in FIG. 11, only when cartridge 10 is loaded into the magnetic tape apparatus and when leader block 14 has been returned to cartridge 10 after completion of recording or reproduction.

While the foregoing embodiment has shown an example in which brush cam plate 21 is used for restraining the path along which brush unit 22 is moved, a cam groove may be formed in deck base 7 on which magnetic head 2 and a variety of mechanisms are fixed, if a sufficient space cannot be ensured over brush unit 22, and so on.

Also, while the foregoing embodiment has shown an example in which brush plate spring 27 is used as means for pressing brush 24 onto magnetic head 2 at the position indicated in FIG. 11, another resilient element such as a coil spring or rubber, for example, may be used instead.

Further, the foregoing embodiment has shown the configuration in which brush 24 comes into contact with magnetic head 2 when threader arm 4 stays at a position at which leader block 14 attached to the leading end of magnetic tape 13 is pulled out from cartridge 10. Alternatively, brush 24 can be configured to come into contact with magnetic head 2 when threader arm 4 stays at a different position by changing the position at which brush holder 23 is attached to brush arm 25, or by changing the shape of the cam groove. In this case, threader arm 4 is controlled to move to a position at which brush 24 comes into contact with magnetic head 2 before magnetic head 2 is cleaned.

Further, while the foregoing embodiment has shown that bearings 6-1, 6-2 are attached to both ends of brush arm 25, the bearings may be attached to other positions of brush arm 25, for example, at positions spaced by a predetermined distance from both ends.

While preferred embodiments of the present invention have been described using specific terms, such description is for illustrative purposes only, and it is to be understood that changes and variations may be made without departing from the spirit or scope of the following claims.

What is claimed is:

1. A magnetic head cleaner mechanism for use with a magnetic tape apparatus loadable with a cartridge capable of holding a wound magnetic tape therein, and having a magnetic head, a machine reel for winding said magnetic tape, and a threader arm for moving the leading end of said magnetic tape between said cartridge and said machine reel, comprising:

a brush arm having a first portion rotatably attached to said threader arm;

a cam groove, said brush arm having a second portion slidably engaged with said cam groove;

a brush holder attached to said brush arm; and a brush attached to said brush holder, wherein said brush comes into contact with said magnetic head when said threader arm stays at a predetermined position, and moves away from said magnetic head when said threader arm stays at a position away from said predetermined position.

2. The magnetic head cleaner mechanism according to claim 1, wherein said predetermined position of said threader arm is a position at which the end of said magnetic tape is pulled out from said cartridge.

3. The magnetic head cleaner mechanism according to claim 1, further comprising a resilient element for urging said brush holder toward said magnetic head when said threader arm stays at said predetermined position.

4. The magnetic head cleaner mechanism according to claim 3, wherein said resilient element is a leaf spring.

5. The magnetic head cleaner mechanism according to claim 1, wherein said cam groove is formed in a brush cam plate attached to a deck base for fixing thereon associated members of said magnetic tape apparatus.

6. The magnetic head cleaner mechanism according to claim 1, wherein said cam groove is formed in a deck base for fixing thereon associated members of said magnetic tape apparatus.

7. The magnetic head cleaner mechanism according to claim 1, wherein said cam groove has a shape which causes said brush to move, associated with movements of said threader arm, not only in a direction parallel to the surface of said magnetic head but also in a direction perpendicular to the surface of said magnetic head.

* * * * *